(12) United States Patent
Ishimura et al.

(10) Patent No.: US 6,243,343 B1
(45) Date of Patent: Jun. 5, 2001

(54) OPTICAL DISK, OPTICAL DISK REPRODUCING DEVICE AND OPTICAL DISK REPRODUCTION SYSTEM

(75) Inventors: Yutaka Ishimura; Morihiro Murata; Kenichiro Takeshita, all of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/236,946

(22) Filed: Jan. 25, 1999

(30) Foreign Application Priority Data

Jan. 31, 1998 (JP) .................................................. 10-034038

(51) Int. Cl.⁷ ...................................................... G11B 5/09
(52) U.S. Cl. ..................... 369/53.41; 369/32; 369/53.44; 369/47.54
(58) Field of Search .................................. 369/58, 54, 32, 369/47, 48, 275.3; 360/48

(56) References Cited

U.S. PATENT DOCUMENTS

| | | | |
|---|---|---|---|
| 5,341,356 | * 8/1994 | Dieleman et al. ..................... | 369/47 |
| 5,434,837 | * 7/1995 | Haneda et al. ......................... | 369/58 |
| 5,684,786 | * 11/1997 | Schylander et al. ............... | 369/275.3 |
| 5,825,726 | * 10/1998 | Hwang et al. ......................... | 369/32 |
| 5,878,019 | * 3/1999 | Schylander et al. .................. | 369/48 |

* cited by examiner

Primary Examiner—Thang V. Tran
(74) Attorney, Agent, or Firm—Pillsbury Winthrop LLP

(57) ABSTRACT

Recording surface of an optical disk is segmented radially into a plurality of volumes each including a lead-in area, program area and lead-out area. In each of the volumes, information indicating presence of a succeeding volume is recorded in a main channel of the program or lead-out area. Dedicated player can receive the information indicating presence of a succeeding volume during reproduction of the first volume and thus is allowed to access the second volume. By contrast, non-dedicated or ordinary CD-ROM players have no capability to read the information indicating presence of a succeeding volume and thus is only allowed to reproduce the first volume without knowing the presence of the succeeding volume.

18 Claims, 7 Drawing Sheets

OPTICAL DISK, OPTICAL DISK REPRODUCING DEVICE AND OPTICAL DISK REPRODUCTION SYSTEM

BACKGROUND OF THE INVENTION

The present invention relates to an optical disk, an optical disk reproducing device and an optical disk reproduction system which allow only part of recorded information to be selectively reproduced from the optical disk depending on the type of the reproducing device employed.

For game software recorded in a CD-ROM, it is sometimes desire that the stored game software be able to be reproduced only via a dedicated game machine rather than non-dedicated or ordinary CD-ROM players. Further, for a plurality of pieces of information recorded on an optical disk, one may desire that only some of the stored pieces of information to able to be selectively reproduced from the optical disk depending on the type of a disk player used. However, there have heretofore been no optical disk and optical disk reproducing device that satisfy such demands.

SUMMARY OF THE INVENTION

It is therefor an object of the present invention to provide an optical disk, an optical disk reproducing device and an optical disk reproduction system which allow only part of recorded information to be selectively reproduced from the optical disk depending on the type of the disk reproducing device used.

According to an aspect of the present invention, there is provided an optical disk which has a recording surface segmented radially into a plurality of volumes for recording information, each of the volumes including a lead-in area, a program area and a lead-out area. Succeeding-volume information announcing presence of a succeeding volume is recorded in a main channel of either or both of the program area and lead-out area of each of the volumes.

Non-dedicated or ordinary optical disk reproducing device can reproduce the first volume, but can not access any other volume succeeding the first volume due to its incapability to read (identify) the succeeding-volume information announcing presence of one or more volumes succeeding the first volume. By contrast, a dedicated or specialized optical disk reproducing device, equipped with the capability to read (identify) the succeeding-volume information, can know the presence of the succeeding volumes and thus is allowed to access these volumes in a sequential fashion.

It will be appreciated that the succeeding-volume information may be recorded in a file within a manageable range of a file system, or may be recorded, as data outside a manageable range of a file system, at a predetermined location on a recording format of the main channel.

According to another aspect of the present invention, there is provided an optical disk reproducing device for reproducing the above-mentioned optical disk, which, during reproduction of each of the volumes on the optical disk, reads out the succeeding-volume information announcing presence of the succeeding volume positioned after the volume being reproduced, and which permits access to the succeeding volume when the succeeding-volume information is read out from the optical disk but inhibits access to the succeeding volume when no succeeding-volume information is read out from the optical disk.

In a preferred implementation, a reproduction permission level unique to the optical disk reproducing device is set to determine up to which of the volumes reproduction of recorded information is permitted, and the optical disk reproducing device permits access up to either one of a last volume indicated by the succeeding-volume information and a last reproducible volume determined by the reproduction permission level which is smaller in volume number than the other and inhibits access to any other volume succeeding the one volume for which the access is permitted thereby.

According to still another aspect of the present invention, there is provided an optical disk reproduction system which comprises an optical disk reproducing device for reproducing the above-mentioned optical disk that has capability to read succeeding-volume information, and a host computer connected with the optical disk reproducing device. The optical disk reproducing device, during reproduction of each of the volumes on the optical disk, reads out the succeeding-volume information announcing presence of the succeeding volume positioned after the volume being reproduced and transfers the succeeding-volume information to the host computer. When the succeeding-volume information announcing presence of the succeeding volume is received from the optical disk reproducing device, the host computer allows the optical disk reproducing device to access the succeeding volume, but when no succeeding-volume information announcing presence of the succeeding volume is received, the host computer inhibits the optical disk reproducing device from accessing the succeeding volume.

According to still another aspect of the present invention, there is provided an optical disk reproduction system which comprises an optical disk reproducing device for reproducing the above-mentioned optical disk that has no capability to read succeeding-volume information or has such capability but does not utilize the capability, and a host computer connected with the optical disk reproducing device. The host computer extracts, from among information transferred from the optical disk reproducing device, the succeeding-volume information announcing presence of a succeeding volume on the optical disk, and wherein when the succeeding-volume information announcing presence of a succeeding volume is obtained, the host computer allows the optical disk reproducing device to access the succeeding volume, but when no succeeding-volume information announcing presence of a succeeding volume is obtained, the host computer inhibits the optical disk reproducing device from accessing the succeeding volume. Alternatively, the host computer may send the extracted succeeding-volume information back to the optical disk reproducing device so that the optical disk reproducing device itself, in place of the host computer, performs control for permitting or inhibiting access to the succeeding volume.

The present invention also provides a second-type optical disk which has a recording surface segmented radially into a plurality of volumes for recording information, each of the volumes including a lead-in area, a program area and a lead-out area. Succeeding-volume information announcing presence of each individual volume succeeding the first volume is recorded in a main channel of either or both of the program area and lead-out area of each of the volumes. In this case too, the succeeding-volume information may be recorded in a file within a manageable range of a file system, or may be recorded, as data outside a manageable range of a file system, at a predetermined location on a recording format of the main channel.

Optical disk reproducing device for reproducing the second-type optical disk is characterized in that, during reproduction of the first volume or each of the volumes on the optical disk, it reads out the succeeding-volume information announcing presence of each individual volume positioned after the volume being reproduced, and permits access up to a particular one of the volumes whose presence is confirmed last by the succeeding-volume information read out thereby and inhibits access to any other volume succeeding the particular volume. In a preferred implementation, a reproduction permission level unique to the optical disk reproducing device is set to determine up to which of the volumes reproduction of recorded information is permitted, and the optical disk reproducing device permits access up to a particular one of the volumes whose presence is confirmed last by the read-out succeeding-volume information and a last reproducible volume determined by the reproduction permission level which is smaller in volume number than the other and inhibits access to any other volume succeeding the particular volume.

The access control based on the above-mentioned reproduction permission level scheme may be performed in such a manner that, during reproduction of the first volume or each of the volumes, the reproducing device reads out the succeeding-volume information, announcing presence of each individual volume positioned after the volume being reproduced, up to a location which a last reproducible volume determined by the reproduction permission level belongs to and the reproducing device permits access up to a particular one of the volumes whose presence is confirmed by the succeeding-volume information read out thereby and inhibiting access to any other volume succeeding the particular volume.

There is also provided an optical disk reproduction system for reproducing the second-type optical disk, which comprises an optical disk reproducing device that has capability to read succeeding-volume information, and a host computer connected with the optical disk reproducing device. The optical disk reproducing device, during reproduction of the first volume or each of the volumes on the optical disk, reads out the succeeding-volume information announcing presence of each individual volume positioned after the volume being reproduced and transfers the succeeding-volume information to the host computer. The host computer, in turn, allows the optical disk reproducing device to access up to a particular one of the volumes whose presence is confirmed last by the succeeding-volume information transferred from the optical disk reproducing device and inhibits the optical disk reproducing device from accessing any other volume succeeding the particular volume.

According to another aspect of the present invention, there is provided an optical disk reproduction system for reproducing the second-type optical disk, which comprises an optical disk reproducing device that has no capability to read succeeding-volume information or has such capability but does not utilize the capability, and a host computer connected with the optical disk reproducing device. The host computer extracts, from among information transferred from the optical disk reproducing device, the succeeding-volume information announcing presence of each individual volume positioned after the first one of the volumes on the optical disk. The host computer allows the optical disk reproducing device to access up to a particular one of the volumes whose presence is confirmed last by the succeeding-volume information extracted thereby and inhibits the optical disk reproducing device from accessing any other volume succeeding the particular volume. Alternatively, the host computer may send the extracted succeeding-volume information back to the optical disk reproducing device so that the optical disk reproducing device itself, in place of the host computer, performs control for permitting or inhibiting access to the succeeding volume.

BRIEF DESCRIPTION OF THE DRAWINGS

For better understanding of the above and other features of the present invention, preferred embodiments of the invention will hereinafter be described in greater detail with reference to the accompanying drawings, in which.

DETAILED DESCRIPTION OF THE PREFERRED EMBODIMENTS

[First Embodiment]

First embodiment of the present invention will be described in relation to an optical disk which is a CD-ROM for game software having its recording surface radially segmented into two sections that will hereinafter be called "volumes" for recording information and where the first section or volume stores desired video information (or a combination of video and audio information) while the second volume stores game software. In this example, both the information stored in the first volume and the information stored in the second volume are arranged for reproduction via a dedicated game machines; however, only the video information (or the video and audio information) in the first volume is reproducible via non-dedicated or ordinary CD-ROM players with the presence of the second volume unrecognizable thereby.

Figure 1:
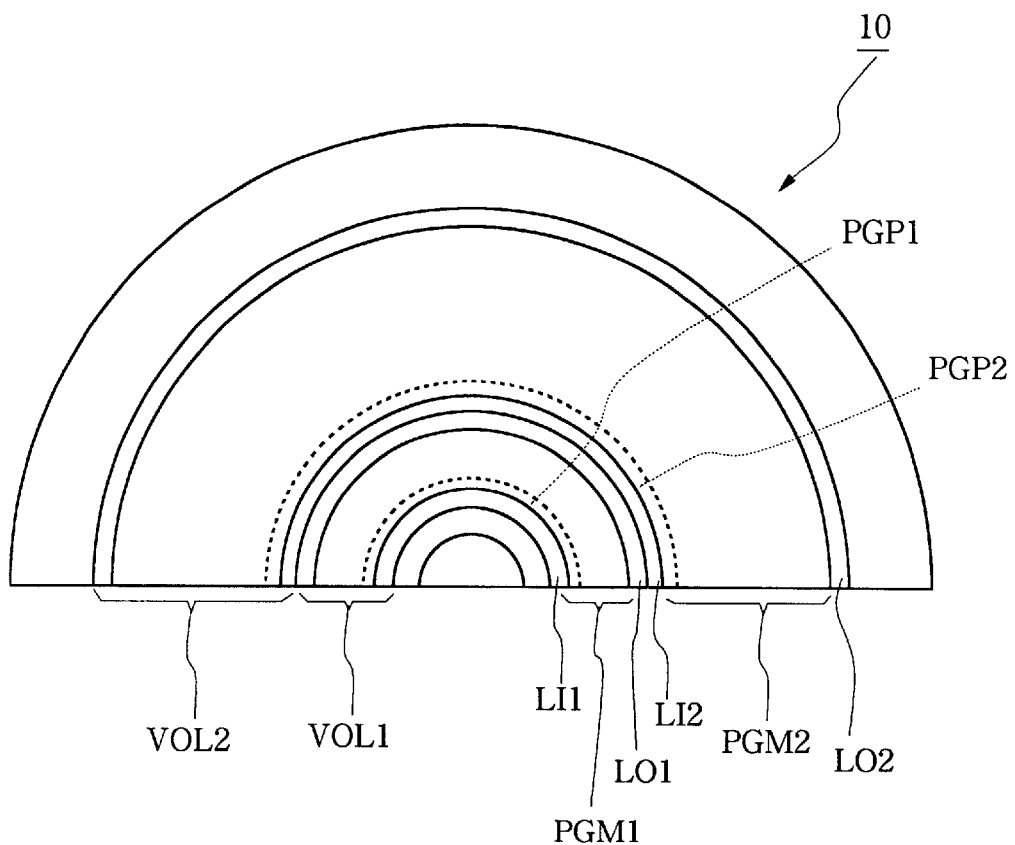
FIG. 1 is a plan view showing a half of an optical disk in accordance with a first embodiment of the present invention and more particularly illustrating how the optical disk is radially segmented into a plurality of volumes.

FIG. 1 is a plan view showing part of an optical disk in accordance with the first embodiment of the present invention, and the optical disk 10 is 12 cm in diameter as with the existing CDs. On the recording surface of the optical disk 10, there are provided two radially-segmented sections, i.e., the first and second volumes VOL1 and VOL2, adjoining to each other. The first and second volumes VOL1 and VOL2 may have same recording density; alternatively, the first volume may have recording density of the currently acceptable CD format and the second volume may have higher recording density.

Each of the first and second volumes VOL1 and VOL2 includes an inner lead-in area LI, a central program area PGM and an outer lead-out area LO, and information is recorded on each of these areas in the CD-ROM format. In the lead-in area, there is recorded TOC (Table-OF-Contents) information of the volume to which it belongs. Addresses are imparted to the individual volumes in such a manner that none of the addresses duplicates between the first and second volumes; for example, addresses starting with a predetermined initial value may be allocated to the first volume, and addresses starting with a value immediately following a last value of the first volume may be allocated to the second volume. In cases where addresses duplicating between the first and second volumes are used, it is preferable that volume number information be recorded, for example, in the ZERO field of the Q subcode so that a dedicated game machine can read the volume number information to identify the volume number corresponding to the addresses.

Information indicating presence of a succeeding volume (hereinafter "succeeding-volume information") is recorded in a main channel of a pre-gap PGP provided, for example, at the beginning of the program area of each of the volumes. Whereas the main channel of the pre-gap PGP in normal CD-ROMs contains a value "0" at its every bit, particular one or more bits of the pre-gap are set, in the embodiment, to a value "1" to indicate that there is another volume succeeding the instant volume. In the illustrated example of FIG. 1, one or more bits of the pre-gap PGP1 in the first volume VOL1 are set to the value "1" indicating presence of the second volume VOL2, and all the bits of the pre-gap PGP 2 in the second volume VOL2 are set to the value "0" because there is not a third volume after the second volume VOL 2.

Although various kinds of data formats are presently available for CD-ROMs, any one of the mode-1, mode-2 and form-1 format containing EDC (Error Detection Code) and ECC (Error Correction Code) is most preferable because they permit high-accuracy data reproduction and hence high-accuracy detection of the above-mentioned succeeding-volume information.

Figure 2:
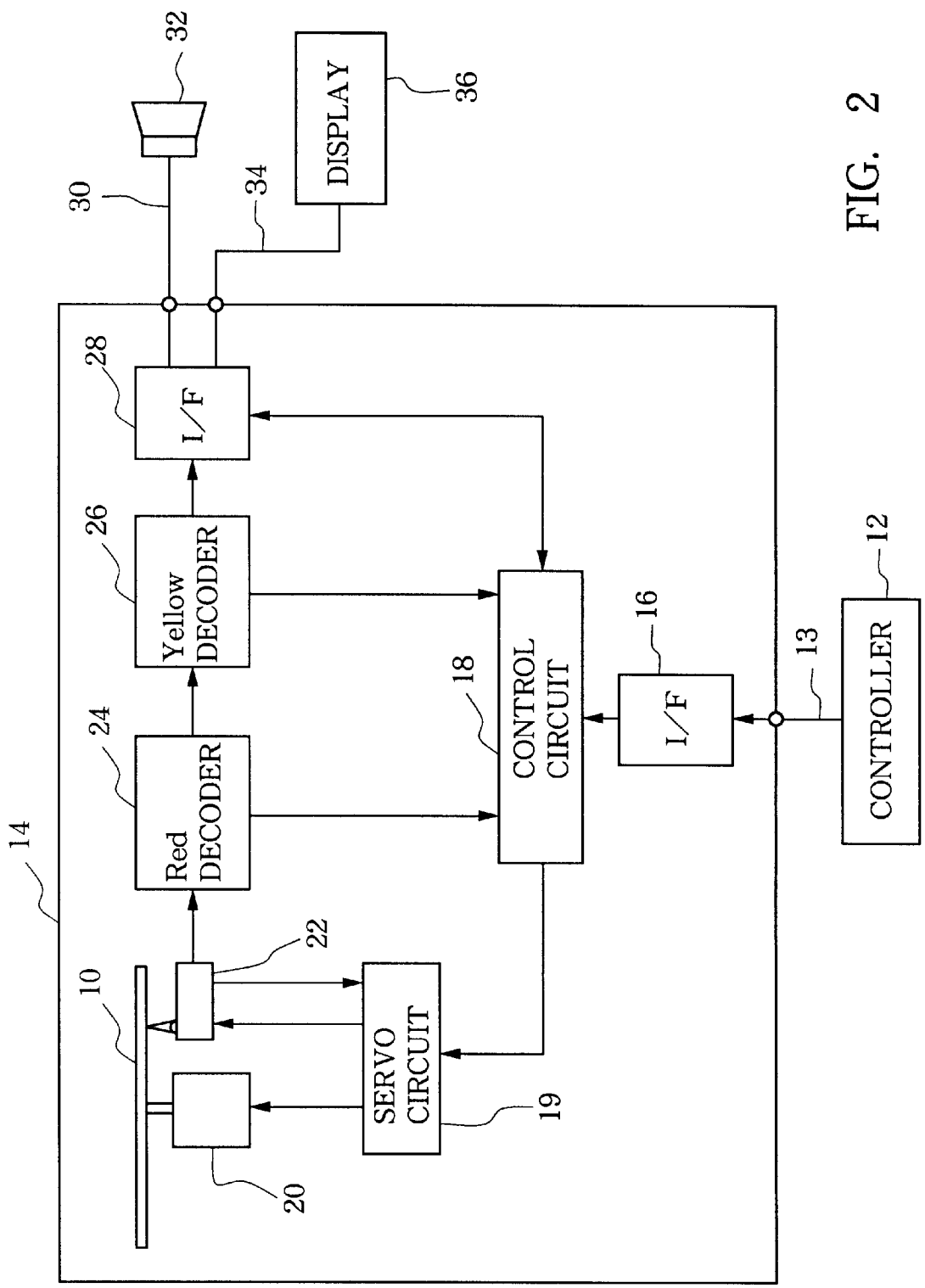
FIG. 2 is a block diagram showing a hardware setup of an optical disk reproducing device for reproducing the optical disk of FIG. 1.

FIG. 2 is a block diagram showing a hardware setup of a game machine 14 dedicated to reproducing the optical disk 10 of FIG. 1. Controller 12 outputs, via a transmission cable 13, various operational instructions to the dedicated game machine 14. In the game machine 14, a control circuit 18 receives the instructions from the controller 12 via an interface circuit 16, in accordance with which the control circuit 18 controls a spindle motor 20 and an optical pickup 22, by means of a servo circuit 20, to read out recorded information from the optical disk 10.

Each output signal from the optical pickup 22 is sent to a "Red" decoder 24, where it is subjected CD signal processing based on the Red Book Standard, to provide a decoded signal. The decoded signal is then passed to a "Yellow" decoder 26 for CD-ROM signal processing based on the Yellow Book standard. The thus-decoded audio or video signal is output from the game machine 14 via an interface circuit 28; the audio signal is supplied via a transmission cable 30 to a speaker 32 for audible reproduction or sounding, while the video signal is supplied via a transmission cable 34 to a display 36 for visual reproduction.

Figure 3:
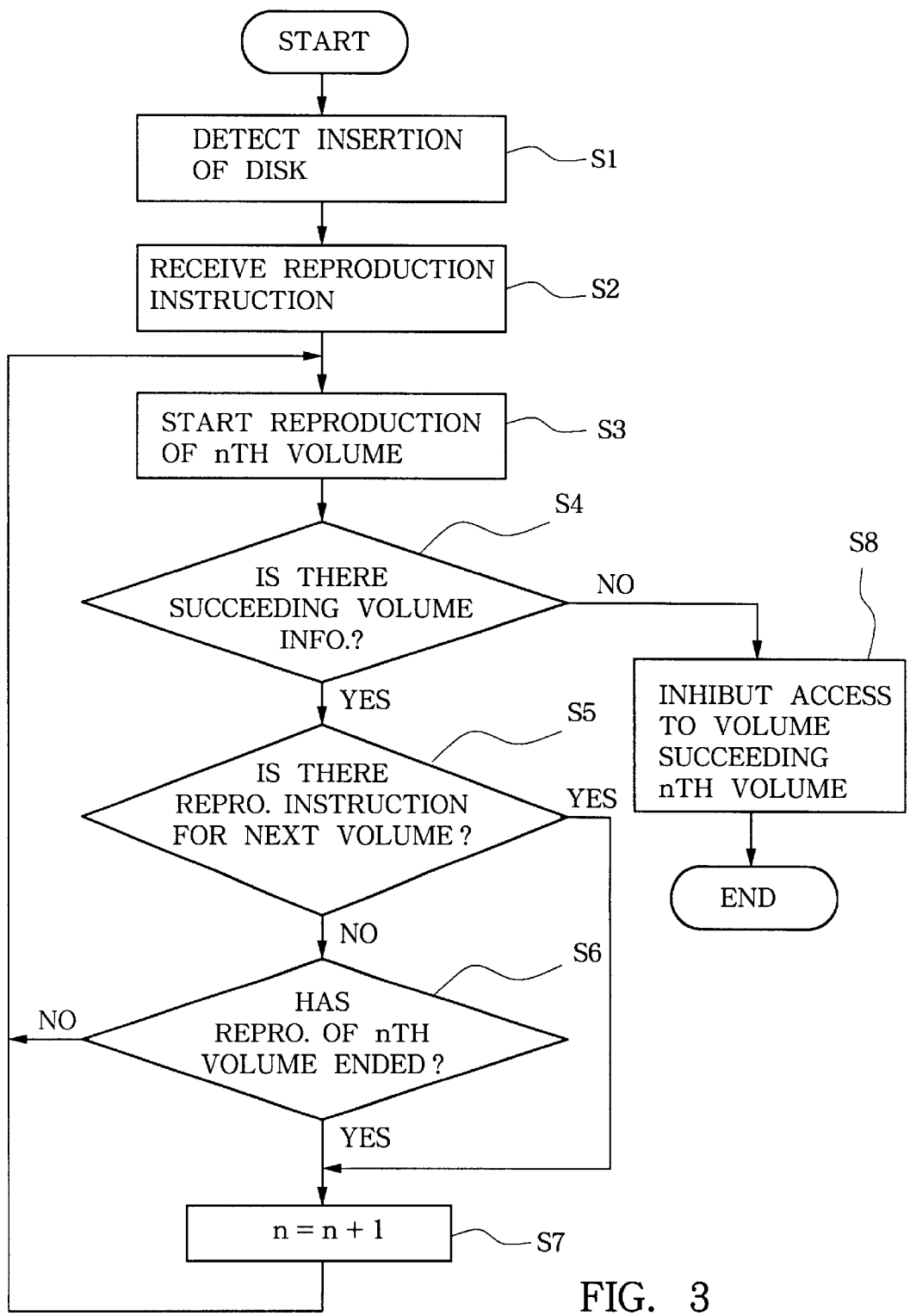
FIG. 3 is a flow chart outlining operation of the optical disk reproducing device of FIG. 2 when it reproduces the optical disk of FIG. 1.

FIG. 3 is a flow chart outlining operation of the game machine 14 of FIG. 2 when it reproduces the optical disk 10. Once the optical disk 10 is inserted on place within the game machine 14 at step SI and a reproduction instruction is given at step S2, the reproduction of the recorded information is started with the first volume VOL1 at step S3; namely, at step S3, the TOC information of the first volume VOL1 is first read out from the lead-in area LI1 and then the program area PGM1 is reproduced. During the reproduction of the program area PGM1, the succeeding-volume information, announcing presence of the next or second volume, is first read out from the pre-gap PGP1 at step S4, and then the main information, i.e., the video information (or a combination of the video and audio information), of the first volume VOL1 is reproduced on the display 36 (or on the display 36 and through the speaker 32).

Once, after detection of the succeeding-volume information, an instruction to reproduce the next volume is given in response to manual operation of the controller 12 by a human operator during the reproduction of the first volume VOL1 (step S5), or upon completion of the reproduction of the first volume VOL1 (step S6), access is made to the starting point of the second volume VOL2 to reproduce the second volume VOL2 (steps S7 and S3). Because the start address of the lead-out area in the first volume VOL1 is previously known from the TOC information of the first volume VOL1, the starting point of the second volume VOL2 can be calculated if the lead-out area of the first volume is set to a predetermined length. No information indicating presence of a third information is contained in the pre-gap PGP2 of the second volume VOL2 (step S4), so that access to any other volume succeeding the second volume is inhibited at step S8.

When the optical disk 10 is reproduced by a non-dedicated or ordinary CD-ROM player, the player can not detect the presence of the second volume VOL2 due to it's incapability to read the succeeding-volume information. Thus, the ordinary CD-ROM player can not access the second volume VOL2 and is only capable of reproducing the video information (or the video and audio information) recorded in the first volume VOL1.

Whereas the optical disk has been described as having two volumes, it may have three or more volumes, in which case it is possible to set a reproduction permission level unique to the optical disk reproducing device. For example, the optical disk reproducing device of reproduction permission level 1 is allowed to read the information announcing the presence of the second volume recorded in the first volume, but is incapable of reading further succeeding-volume information indicating presence of other volume succeeding the second volume, so as to only permit the reproduction of recorded information up to the second volume. The optical disk reproducing device of reproduction permission level 2 is allowed to read the information announcing the presence of the second and third volumes recorded in the first volume and second volume, respectively, but is unable to read further succeeding-volume information signaling presence of any other volume succeeding the third volume, so as to only permit the reproduction up to the third volume (or up to the second volume if the optical disk only has no volume following the second volume).

[Second Embodiment]

Figure 4:
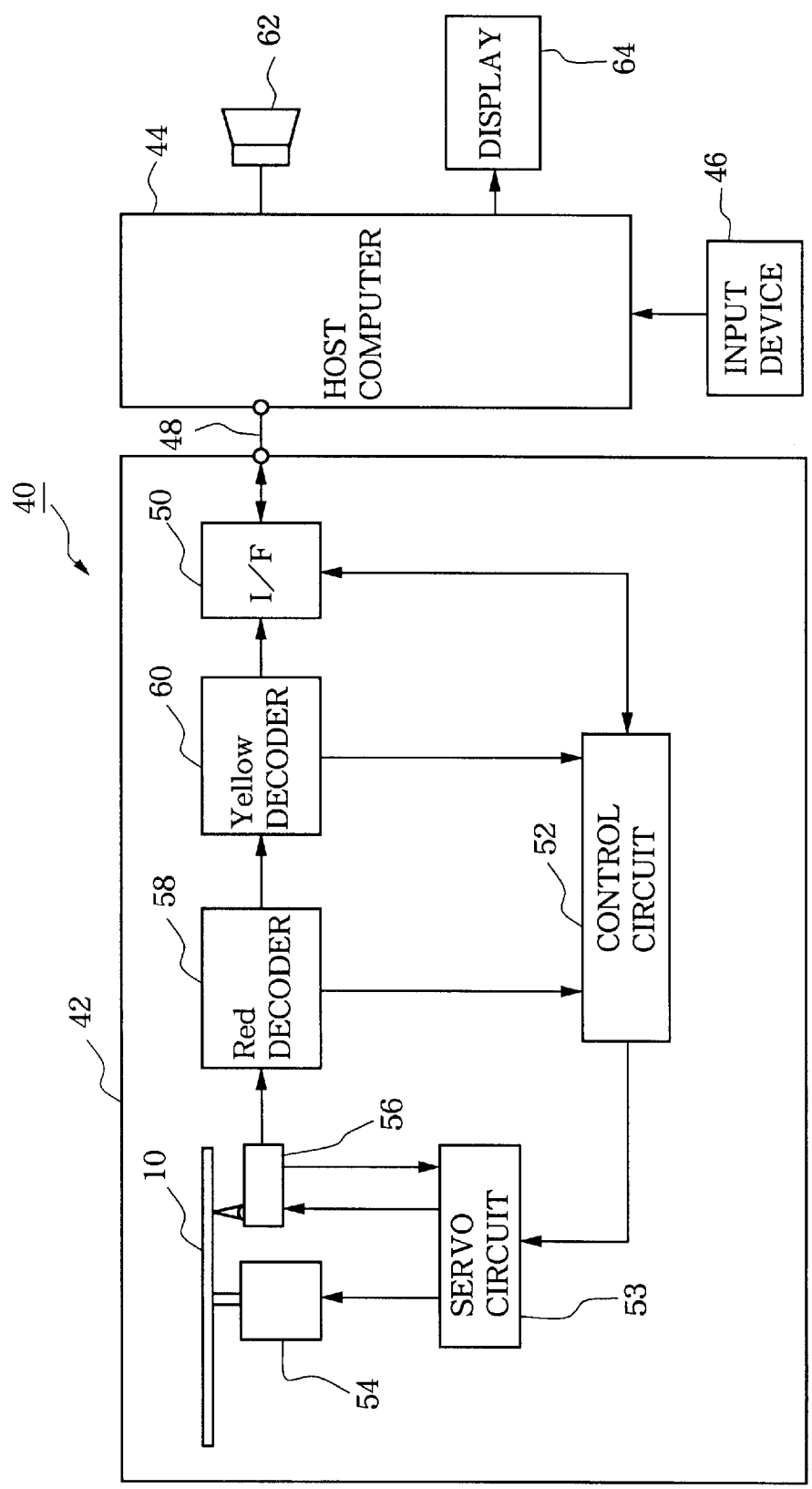
FIG. 4 is a block diagram showing an embodiment of an optical disk reproduction system in accordance with the present invention.

FIG. 4 is a block diagram showing an embodiment of an optical disk reproduction system in accordance with the present invention, which generally comprises a combination of a CD-ROM player 42 and a host computer 44. In the optical disk reproduction system 40, the host computer 44, in response to human operator's operation of input means 46 such as a keyboard or mouse, outputs various operational instructions to the CD-ROM player 42 via a transmission cable 48. In the CD-ROM player 42, a control circuit 52 receives the instructions from the host computer 44 via an interface circuit 50, in accordance with which the control circuit 52 controls a spindle motor 54 and an optical pickup 56, by means of a servo circuit 53, to read out the recorded information from the optical disk 10.

Each output signal from the optical pickup 56 is sent to a "Red" decoder 58, where it is subjected CD signal processing based on the Red Book Standard, to provide a decoded signal. The decoded signal is then passed to a "Yellow" decoder 60 for CD-ROM signal processing based on the Yellow Book standard. The thus-decoded audio or video signal is output from the CD-ROM player 42 via the interface circuit 50 to the host computer 44. If the decoded signal from the player 42 is audio signal, the host computer 44 audibly reproduces the signal through a speaker 62, while if the decoded signal from the player 42 is video signal, the host computer 44 visually reproduces the signal on a display 64.

The optical disk 10 for use in the reproduction system 40 is arranged, for example, in the same manner as shown in FIG. 1; that is, in each of the volumes, information indicating presence of a next volume, i.e., succeeding-volume information, is recorded in the main channel of the pre-gap located at the beginning of the program area. Further, the CD-ROM player 42 in the optical disk reproduction system 40 may or may not have the capability to read the succeeding-volume information, as will be described below.

Now, with reference to FIG. 5, a description will be made about a protocol for conducting exchange of various information between the CD-ROM player 42 having the capability to read (identify) the succeeding-volume information and the host computer 44. As an example, the protocol will be considered in relation to SCSI/ATAPI commands.

Figure 5:
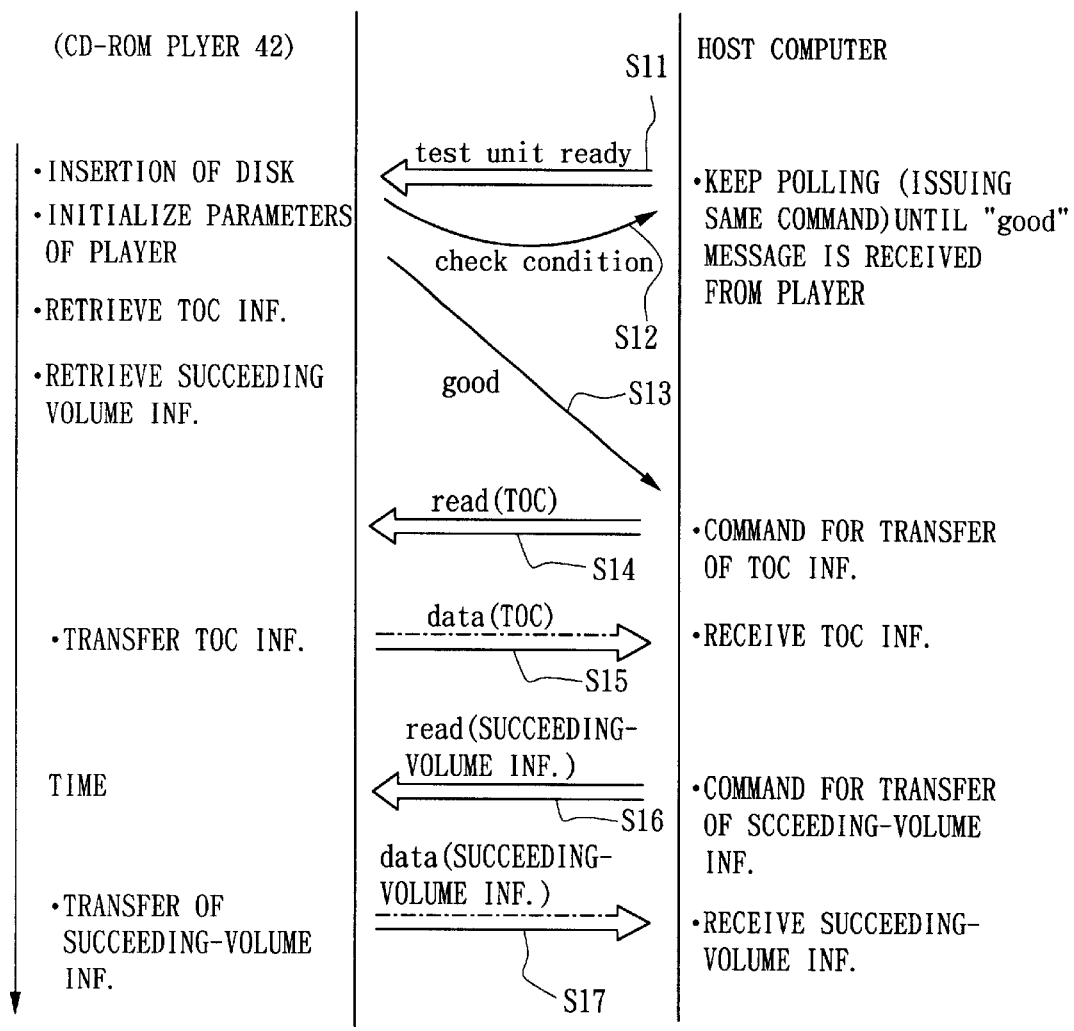
FIG. 5 is a diagram explanatory of a protocol for conducting exchange of various information between a CD-ROM player having capability to read succeeding-volume information from the optical disk and a host computer in the reproduction system of FIG. 4.

In FIG. 5, the host computer 44 issues a "test unit ready" command, at step S11, to ascertain whether or not the optical disk has been inserted in the CD-ROM player 42 and the player 42 is ready to receive commands such as a "read/reproduce audio" command. The host computer 44 keeps issuing the "test unit ready" command until the CD-ROM player 42 becomes quite ready for reception of the "read/reproduce audio" command etc. If the CD-ROM player 42 is not yet ready for reception of the "read/reproduce audio" command etc., the player 42 outputs a "check condition" message at step S12 indicating an error condition where it still can not receive the access-related commands.

Once the optical disk has been inserted in the CD-ROM player 42, the player 42 initializes various parameters possessed thereby and then reproduces the lead-in area LI1 of the first volume VOL1 to retrieve the TOC information of the volume VOL1. The CD-ROM player 42 further retrieves the succeeding-volume information, announcing presence of the next or second volume, from the pre-gap PCP1 located at the beginning of the program area PGM1 of the first volume VOL1. The CD-ROM player 42, having thus obtained these pieces of information, is now completely ready to receive the access-related commands and outputs a "good" message at step S13 indicating its readiness for reception of the commands. Upon receipt of the "good" message from the player 42, the host computer 44 issues a "read TOC" command to instruct transfer of the TOC information at step S14. In response to the "read TOC" command, the CD-ROM player 42 transfers the read-out TOC information to the host computer 44 at step S15.

At next step S16, the host computer 44 issues a "read succeeding-volume information" command to further instruct transfer of the succeeding-volume information. In response to the command, the CD-ROM player 42 transfers the succeeding-volume information to the host computer 44 at step S17. Upon receipt of the succeeding-volume information from the player 42, the host computer 44 uses output means, such as the display 64 and speaker 62 to inform the human operator of the presence of the next volume (second volume in this case). Then, when the human operator operates the input means 46, such as the keyboard or mouse, to instruct access to the next volume, the host computer 44 issues a command instructing the player 42 to access the next or second volume VOL2, in response to which the player 42 makes access to the next volume.

Alternatively, the host computer 44 may instruct access to the next volume without intervention by the human operator; more specifically, the host computer 44 may instruct the player 52 to access to the next volume on the basis of succeeding-volume information received by a device driver of the computer 44, rather than in accordance with the instruction entered by the operator. Further, the control to permit or inhibit access to the next volume may be performed singly by the CD-ROM player 42 on the basis of the succeeding-volume information held by the player 42 itself, or in accordance with the instruction from the host computer 44 based on the succeeding-volume information held by the computer 44.

On the other hand, in the case where the CD-ROM player 42 does not have the capability to read the succeeding-volume information, the host computer 44 is supplied with almost every raw recorded data from the player 42 and reads out the succeeding-volume information from among the supplied data so as to perform the control to permit or inhibit access to the next volume on the basis of the read-out information. In an alternative, the succeeding-volume information read out by the host computer 44 may be sent back to the CD-ROM player 42, so as to allow the player 42 to perform the above-mentioned access control by itself. It will be appreciated that even where the CD-ROM player 42 has the capability to read the succeeding-volume information, the raw recorded data may be transferred directly to the host computer 44 for identification by the computer 44.

[Third Embodiment]

Whereas the succeeding-volume information has been described above as recorded in the main channel of the pre-gap of each volume, it may be recorded in the main channel of the lead-out area of each channel as will be described below. The succeeding-volume information of each volume is recorded as data outside a manageable range of a file system.

Figure 6:
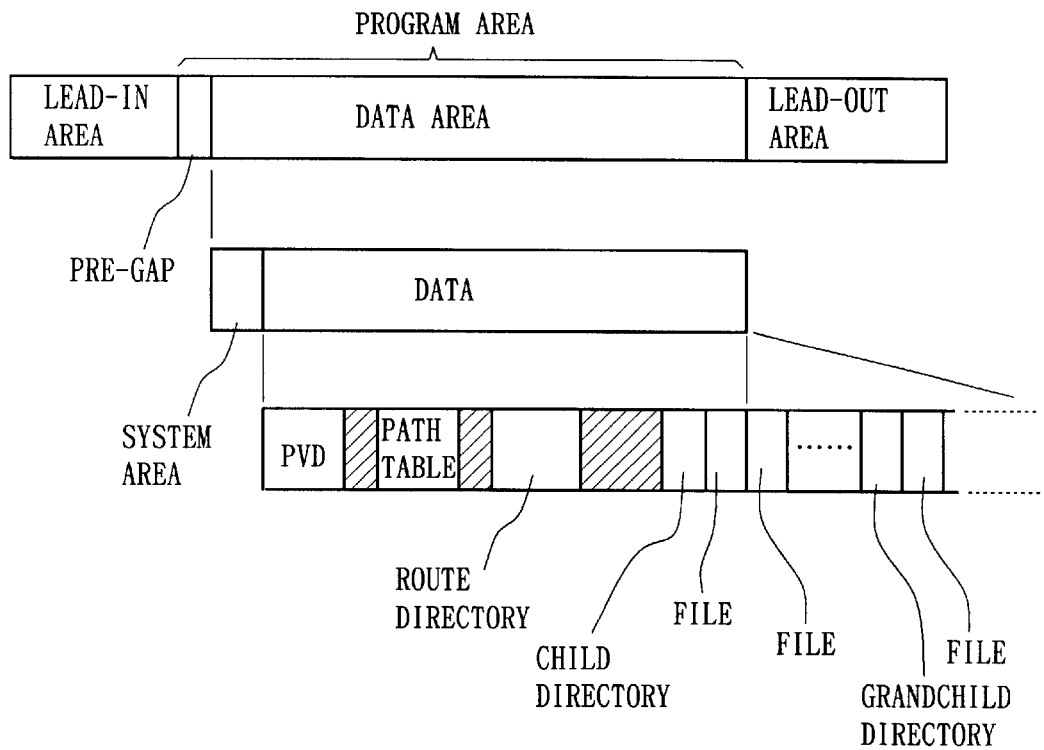
FIG. 6 is a diagram explanatory of an ISO-9660 file format.

The succeeding-volume information may also be recorded in the main channel of the program area of each volume. FIG. 6 shows an ISO-9660 file structure, where the succeeding-volume information can be recorded as a file within the manageable range of the file system. In addition, small empty spaces may be provided between the PVD (Primary Volume Descriptor), path table, director and file, as denoted by hatched blocks in FIG. 6, so that the succeeding-volume information is recorded dispersedly in these spaces. Because the succeeding-volume information in this case is treated as data outside the manageable range of the file system, the information has to be recorded at predetermined fixed address locations so that the player identifies the thus-recorded succeeding-volume information by previously ascertaining the address locations.

Now, with reference to FIG. 7, a description will be made about a protocol for conducting exchange of various information between the CD-ROM player 42 and the host computer 44 in the optical disk reproduction system 40 of FIG.

4, in relation to the case where succeeding-volume information is recorded between the PVD (Primary Volume Descriptor), path table, director and file as data outside the manageable range of the file system.

Figure 7:
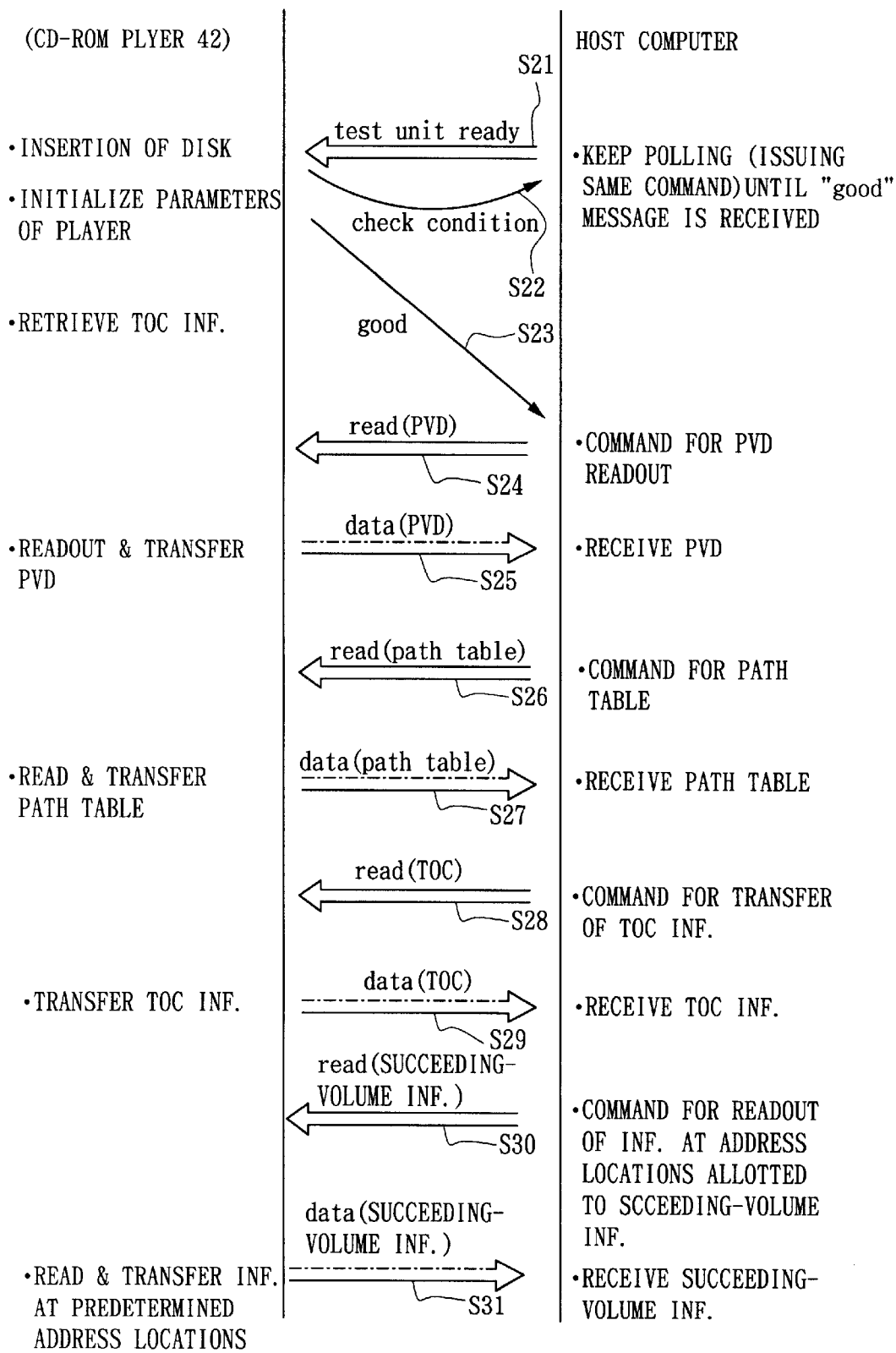
FIG. 7 is a diagram explanatory of a protocol for conducting exchange of various information between a CD-ROM player having no capability to read succeeding-volume information and the host computer in the optical disk reproduction system of FIG. 4.

In FIG. 7, the host computer 44 issues a "test unit ready" command, at step S21, to ascertain whether or not the optical disk has been inserted in the CD-ROM player 42 and the player 42 is ready to receive commands such as a "read/reproduce audio" command. The host computer 44 keeps issuing the "test unit ready" command until the CD-ROM player 42 becomes completely ready for reception of the "read/reproduce audio" command etc. If the CD-ROM player 42 is not yet ready for reception of the "read/reproduce audio" command etc. the player 42 outputs a "check condition" message at step S22 indicating an error condition where it still can not receive the access-related commands.

Once the optical disk has been inserted in the CD-ROM player 42, the player 42 initializes various parameters possessed thereby and then reproduces the lead-in area LI1 of the first volume VOL1 to retrieve the TOC information of the volume VOL1. As soon as the CD-ROM player 42 has become completely ready to receive the access-related commands, it outputs a "good" message at step S23 indicating its readiness for reception of the commands. Upon receipt of the "good" message from the player 42, the host computer 44 sends a "read (PVD)" instruction at step S24, in accordance with which the CD-ROM player 42 reads out the PVD of the volume and transfers the read-out PVD to the computer 44 at step S25. Then, the host computer 44 issues a "read (path table)" instruction at step S26, in accordance with which the CD-ROM player 42 reads out the path table of the volume and transfers the read-out path table to the computer 44 at step S27.

Then, the host computer 44 issues a "read TOC" command step S28, in accordance with which the CD-ROM player 42 reads out the TOC information of the volume and transfers the read-out TOC information to the computer 44 at step S29. Also, at step S30, the host computer 44 issues an instruction to read out the information at the above-mentioned predetermined address locations previously ascertained by the host computer 42. In accordance with this instruction, the CD-ROM player 42 reads out the information at the address locations and then transfers the read-out information to the computer 44 at step S31. In turn, the host computer 44 identifies the transferred data, so that when the succeeding-volume information is obtained, the computer 44 returns the succeeding-volume information so as to allow the player 42 to access the next volume, but when no succeeding-volume information is obtained, the computer 44 inhibits the player 42 from accessing the next volume.

When the succeeding-volume information is obtained, the host computer 44 instructs the CD-ROM player 42 to make access to the next or second volume VOL2 in response to the operator's access-instructing operating via the input means 46. In accordance with such an instruction from the host computer 44, the player 42 executes the access to the succeeding volume.

[Fourth Embodiment]

For the above-described embodiments, each of the volumes has been described as containing a single piece of information indicating presence of an immediately following or next volume. According to another embodiment of the present invention, however, pieces of information, collectively announcing presence of each individual volume (i.e., all volumes) succeeding the first volume on the optical disk (hereinafter also called "collective succeeding-volume information"), may be recorded only in the first volume or in each one of the volumes. Such collective succeeding-volume information announcing presence of each individual succeeding volume may be recorded at respective predetermined locations, in ascending order of their respective volume numbers, in the main channel of either one or both of the program and lead-out areas in the first volume or redundantly in each one of the volumes. In the case where the information announcing presence of each individual succeeding volume is recorded in the program area, it can be written as data within a manageable range of a file system, or as data at predetermined fixed locations on a given data recording format outside the manageable range. If, on the other hand, the information is recorded in the lead-out area, it can be written, as data outside the manageable range of the file system, at predetermined fixed locations on a given data recording format. With the optical disk thus arranged, it is possible to collectively detect the presence of each individual succeeding volume by just reproducing only one of the volumes.

Figure 8:
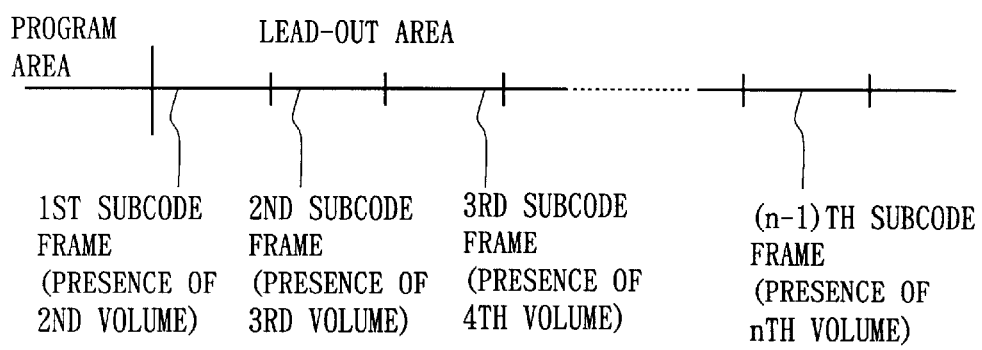
FIG. 8 is a diagram explanatory of an example of a recording format for the succeeding-volume information for use in a situation where a reproduction permission level is set to the optical disk reproducing device.

FIG. 8 shows an example of the optical disk where the collective succeeding-volume information announcing presence of each individual volume succeeding the first volume on the disk is recorded in the lead-out area of the first volume or each one of the volumes. Specifically, in the main channel of the lead-out area, the information announcing presence of the second volume and other volumes following the same is recorded in pieces in ascending order of volume number in a plurality of subcode frames, one piece in each subcode frame.

The optical disk having such collective succeeding-volume information announcing presence of each individual succeeding volume recorded in the first volume or in each one of the volumes can be reproduced by an optical disk reproducing device equipped with the capability to read the collective succeeding-volume information by itself, or in conjunction with a host computer. For an optical disk reproducing device having no capability to read the collective succeeding-volume information, it can reproduce the optical disk in conjunction with a host computer. Procedures (protocol) to be used for reproduction of the optical disk by the reproducing device in conjunction with the host computer may be carried out in substantially the same manner as described earlier in relation to the optical disk having the collective succeeding-volume information in each of the volumes. Namely, as the information announcing the presence of each individual succeeding volume is read out from the optical disk, the optical disk reproducing device permits access to a further volume if its presence has been confirmed or inhibits access to the further volume if its presence has not been confirmed, singly through it's own control based on the information sent back from the host computer or under the control of the host computer.

In one implementation, the optical disk reproducing device may be arranged in such a manner that the succeeding-volume information recorded in the first volume may be read out together for all the succeeding volumes upon detection of the optical disk insertion and the greatest accessible volume number may be informed to the host computer or held by the reproducing device. Alternatively, of the information announcing presence of all the succeeding volumes recorded in each of the volumes, only one piece of the information indicating presence of one of the volumes immediately following a currently-reproduced volume may be selectively read out for transfer to the host computer or for storage in the reproducing device, assuming that each piece of the succeeding-volume information is allocated to one of the subcode frames and the reproducing device knows which of the pieces of the succeeding-volume information is recorded in which of the subcode frames.

In a situation where the optical disk of FIG. 8 is to be reproduced via an optical disk reproducing device for which is preset a unique reproduction permission level, the optical disk reproducing device may be arranged to collectively read out all the pieces of the information for all the succeeding volumes and perform control for permitting access only to some of the volumes falling within a permissible range determined by the unique reproduction permission level. In an alternative, only some of the subcode frames which correspond to the reproduction permission level may be selectively read out during reproduction of the lead-out area, so as to permit access to every succeeding volume whose presence has been confirmed by the succeeding-volume information read out from the corresponding subcode frame. For instance, the optical disk reproducing device of reproduction permission level 1 is only allowed to read the first subcode frame for readout of the information announcing presence of the second volume, so that the reproduction is permitted up to the second volume. The optical disk reproducing device of reproduction permission level 2 is allowed to read the first and subcode frames for readout of the information announcing presence of the second and third volumes, so that the reproduction is permitted up to the third volume (or up to the second volume if the optical disk contains the third volume).

What is claimed is:

1. An optical disk having a recording area on the disk surface segmented radially into a plurality of volumes for recording information, each of said volumes including a lead-in area, a program area and a lead-out area, wherein succeeding-volume information announcing presence of a succeeding volume is recorded in a main channel of either or both of the program area and lead-out area of each of said volumes.

2. An optical disk as recited in claim 1 wherein the succeeding-volume information is recorded in a file within a manageable range of a file system.

3. An optical disk as recited in claim 1 wherein the succeeding-volume information is recorded, as data outside a manageable range of a file system, at a predetermined location on a recording format of the main channel.

4. An optical disk reproducing device for reproducing an optical disk as recited in claim 1 which, during reproduction of each of the volumes on the optical disk, reads out the succeeding-volume information announcing Presence of the succeeding volume positioned after the volume being reproduced, and which permits access to the succeeding volume when the succeeding-volume information is read out from the optical disk but inhibits access to the succeeding volume when no succeeding-volume information is read out from the optical disk.

5. An optical disk reproducing device as recited in claim 4 wherein a reproduction permission level unique to said optical disk reproducing device is set to determine up to which of the volumes reproduction of recorded information is permitted, and which permits access up to either one of a last volume indicated by the succeeding-volume information and a last reproducible volume determined by the reproduction permission level which is smaller in volume number than the other and inhibits access to any other volume succeeding the one volume for which the access is permitted thereby.

6. An optical disk reproduction system comprising an optical disk reproducing device for reproducing an optical disk as recited in claim 1 and a host computer connected with said optical disk reproducing device, wherein said optical disk reproducing device, during reproduction of each of the volumes on the optical disk, reads out the succeeding-volume information announcing presence of the succeeding volume positioned after the volume being reproduced and transfers the succeeding-volume information to said host computer, and wherein when the succeeding-volume information announcing presence of the succeeding volume is received from said optical disk reproducing device, said host computer allows said optical disk reproducing device to access the succeeding volume, but when no succeeding-volume information announcing presence of the succeeding volume is received, said host computer inhibits said optical disk reproducing device from accessing the succeeding volume.

7. An optical disk reproduction system comprising an optical disk reproducing device for reproducing an optical disk as recited in claim 1 and a host computer connected with said optical disk reproducing device, wherein said host computer extracts, from among information transferred from said optical disk reproducing device, the succeeding-volume information announcing presence of a succeeding volume on the optical disk, and wherein when the succeeding-volume information announcing presence of a succeeding volume is obtained, said host computer allows said optical disk reproducing device to access the succeeding volume, but when no succeeding-volume information announcing presence of a succeeding volume is obtained, said host computer inhibits said optical disk reproducing device from accessing the succeeding volume.

8. An optical disk reproduction system comprising an optical disk reproducing device for reproducing an optical disk as recited in claim 1 and a host computer connected with said optical disk reproducing device, wherein said host computer extracts, from among information transferred from said optical disk reproducing device, the succeeding-volume information announcing presence of a succeeding volume on the optical disk and sends the succeeding-volume information back to said optical disk reproducing device, and wherein when the succeeding-volume information announcing presence of a succeeding volume is received from said host computer, said optical disk reproducing device permits access to the succeeding volume, but when no succeeding-volume information announcing presence of a succeeding volume is received, said optical disk reproducing device inhibits the access to the succeeding volume.

9. An optical disk having a recording surface segmented radially into a plurality of volumes for recording information, each of said volumes including a lead-in area, a program area and a lead-out area, succeeding-volume information announcing presence of each individual volume succeeding a first one of the volumes being recorded in a main channel of either or both of the program area and lead-out area of each of said volumes.

10. An optical disk as recited in claim 9 wherein the succeeding-volume information is recorded in a file within a manageable range of a file system.

11. An optical disk as recited in claim 9 wherein the succeeding-volume information is recorded, as data outside a manageable range of a file system, at a predetermined location on a recording format of the main channel.

12. An optical disk reproducing device for reproducing an optical disk as recited in claim 9, which, during reproduction of a first one or each of the volumes on the optical disk, reads out the succeeding-volume information announcing presence of each individual volume positioned after the volume being reproduced, and which permits access up to a particular one of the volumes whose presence is confirmed last by the succeeding-volume information read out thereby and inhibits access to any other volume succeeding the particular volume.

13. An optical disk reproducing device as recited in claim 12 wherein a reproduction permission level unique to said optical disk reproducing device is set to determine up to which of the volumes reproduction of recorded information is permitted, and which permits access up to a particular one of the volumes whose presence is confirmed last by the read-out succeeding-volume information and a last reproducible volume determined by the reproduction permission level which is smaller in volume number than the other and inhibits access to any other volume succeeding the particular volume.

14. An optical disk reproducing device for reproducing an optical disk as recited in claim 9 wherein a reproduction permission level unique to said optical disk reproducing device is set to determine up to which one of the volumes on the optical disk reproduction of recorded information is permitted, and which, during reproduction of a first one or each of the volumes, reads out the succeeding-volume information, announcing presence of each individual volume positioned after the volume being reproduced, up to a location which a last reproducible volume determined by the reproduction permission level belongs to, said optical disk reproducing device permitting access up to a particular one of the volumes whose presence is confirmed by the succeeding-volume information read out thereby and inhibiting access to any other volume succeeding the particular volume.

15. An optical disk reproduction system comprising an optical disk reproducing device for reproducing an optical disk as recited in claim 9 and a host computer connected with said optical disk reproducing device, wherein said optical disk reproducing device, during reproduction of a first one or each of the volumes on the optical disk, reads out the succeeding-volume information announcing presence of each individual volume positioned after the volume being reproduced and transfers the succeeding-volume information to said host computer, and wherein said host computer allows said optical disk reproducing device to access up to a particular one of the volumes whose presence is confirmed last by the succeeding-volume information transferred from said optical disk reproducing device and inhibits said optical disk reproducing device from accessing any other volume succeeding the particular volume.

16. An optical disk reproduction system comprising an optical disk reproducing device for reproducing an optical disk as recited in claim 9 and a host computer connected with said optical disk reproducing device, wherein said host computer extracts, from among information transferred from said optical disk reproducing device, the succeeding-volume information announcing presence of each individual volume positioned after a first one of the volumes on the optical disk, and wherein said host computer allows said optical disk reproducing device to access up to a particular one of the volumes whose presence is confirmed last by the succeeding-volume information extracted thereby and inhibits said optical disk reproducing device from accessing any other volume succeeding the particular volume.

17. An optical disk reproduction system comprising an optical disk reproducing device for reproducing an optical disk as recited in claim 9 and a host computer connected with said optical disk reproducing device, wherein said host computer extracts, from among information transferred from said optical disk reproducing device, the succeeding-volume information announcing presence of each individual volume positioned after a first one of the volumes on the optical disk and sends the succeeding-volume information back to said optical disk reproducing device, and wherein said optical disk reproducing device permits access up to a particular one of the volumes whose presence is confirmed last by the succeeding-volume information sent by said host computer and inhibits access to any other volume succeeding the particular volume.

18. An optical disk device for reproducing an optical disks recited in claim 9 which performs control to selectively read out a piece of information, announcing presence of one of the volumes immediately succeeding another one of the volumes, from among the succeeding-volume information announcing presence of each individual volume.

* * * * *